(12) United States Patent

Redler et al.

(10) Patent No.: US 12,636,702 B2
(45) Date of Patent: May 26, 2026

(54) CALIBRATION OF A SYSTEM FOR SELECTIVE POWDER MELTING

(71) Applicant: REALIZER GMBH, Borchen (DE)

(72) Inventors: Andreas Redler, Paderborn (DE); Meinolf Tepper, Rheda-Wiedenbrück (DE); Daniel Isenberg, Paderborn (DE)

(73) Assignee: REALIZER GMBH, Borchen (DE)

( * ) Notice: Subject to any disclaimer, the term of this patent is extended or adjusted under 35 U.S.C. 154(b) by 750 days.

(21) Appl. No.: 17/800,415

(22) PCT Filed: Feb. 11, 2021

(86) PCT No.: PCT/EP2021/053375
§ 371 (c)(1),
(2) Date: Aug. 17, 2022

(87) PCT Pub. No.: WO2021/165145
PCT Pub. Date: Aug. 26, 2021

(65) Prior Publication Data
US 2023/0084652 A1     Mar. 16, 2023

(30) Foreign Application Priority Data

Feb. 17, 2020    (DE) ..................... 10 2020 201 952.5

(51) Int. Cl.
*B22F 10/28* (2021.01)
*B22F 10/31* (2021.01)
(Continued)

(52) U.S. Cl.
CPC .............. *B22F 10/28* (2021.01); *B22F 10/31* (2021.01); *B29C 64/153* (2017.08); *B33Y 10/00* (2014.12); *B33Y 30/00* (2014.12); *B33Y 50/02* (2014.12)

(58) Field of Classification Search
CPC ........ B22F 10/28; B22F 10/31; B29C 64/153; B33Y 10/00; B33Y 30/00; B33Y 50/02
See application file for complete search history.

(56) References Cited

U.S. PATENT DOCUMENTS

| | | | |
|---|---|---|---|
| 6,215,093 B1 | 4/2001 | Meiners et al. | |
| 6,483,596 B1 | 11/2002 | Philippi et al. | |

(Continued)

FOREIGN PATENT DOCUMENTS

| | | |
|---|---|---|
| CN | 101821081 A | 9/2010 |
| CN | 105358310 A | 2/2016 |

(Continued)

OTHER PUBLICATIONS

International Application No. PCT/EP2021/053375, International Search Report and Written Opinion mailed Apr. 12, 2021, 20 pages.

(Continued)

*Primary Examiner* — Ricardo D Morales
(74) *Attorney, Agent, or Firm* — Kilpatrick Townsend & Stockton LLP

(57) ABSTRACT

A method for calibrating a system that includes a build chamber to accommodate powder to be melted and an object to be produced and a height-adjustable build plate support in the build chamber to support a build plate. The system also includes a controllable optical unit comprising (1) a laser source, (2) a plurality of lenses, and (3) a mirror arrangement having a plurality of adjustably arranged mirrors. The controllable optical unit is configured to selectively direct a laser beam to a point in the build chamber at which to melt the powder. The method includes placing a scanning field plate on the build plate support, creating a plurality of optical reference points on the scanning field plate, generating a measuring grid on the scanning field plate by adjusting the mirrors using a calibration data set, and deter- (Continued)

mining a relative positioning between the optical reference points and the measuring grid.

6 Claims, 1 Drawing Sheet

(51) Int. Cl.
| | |
|---|---|
| *B29C 64/153* | (2017.01) |
| *B33Y 10/00* | (2015.01) |
| *B33Y 30/00* | (2015.01) |
| *B33Y 50/02* | (2015.01) |

(56) References Cited

U.S. PATENT DOCUMENTS

| | | | |
|---|---|---|---|
| 10,946,581 B2 | 3/2021 | Domroöse et al. | |
| 10,960,467 B2 | 3/2021 | Golz et al. | |
| 11,186,043 B2 | 11/2021 | Geisen | |
| 2016/0082668 A1 | 3/2016 | Perret et al. | |
| 2018/0345582 A1 | 12/2018 | Schade | |
| 2018/0370146 A1 | 12/2018 | Domröse et al. | |
| 2019/0047228 A1* | 2/2019 | Brown | G05B 19/4015 |
| 2019/0134892 A1 | 5/2019 | Mamrak et al. | |

FOREIGN PATENT DOCUMENTS

| | | | |
|---|---|---|---|
| CN | 105682900 A | | 6/2016 |
| CN | 108778571 A | | 11/2018 |
| DE | 19905067 A1 | | 8/2000 |
| DE | 19918613 A1 | | 11/2000 |
| DE | 10112591 A1 | | 10/2001 |
| DE | 102005014483 A1 | | 10/2006 |
| DE | 102009038165 A1 | | 2/2011 |
| DE | 102012221641 A1 | | 5/2014 |
| DE | 102013208651 A1 | | 11/2014 |
| DE | 102016200043 A1 | | 7/2017 |
| DE | 102016222210 A1 | | 5/2018 |
| EP | 2052845 A2 | | 4/2009 |
| EP | 3482911 A1 | | 5/2019 |
| WO | 9824574 A1 | | 6/1998 |
| WO | 2017084781 A1 | | 5/2017 |
| WO | 2017158327 A1 | | 9/2017 |

OTHER PUBLICATIONS

Chinese Application No. 202180014871.7, Office Action mailed Mar. 1, 2024, 9 pages.

* cited by examiner

CALIBRATION OF A SYSTEM FOR SELECTIVE POWDER MELTING

CROSS REFERENCE TO RELATED APPLICATION

This application is a U.S. national phase of International Patent Application No. PCT/EP2021/053375 filed on Feb. 11, 2021, which claims priority to German Patent Application No. 10 2020 201 952.5, filed in Germany on Feb. 17, 2020. The entire contents of both applications are hereby incorporated herein by reference.

The present invention relates to a method for calibrating a system for producing objects made of a material powder according to the method of selective powder melting, the system comprising a build chamber which is intended to accommodate the powder to be melted and the object to be produced, a build plate support which is provided in the build chamber in a height-adjustable manner and is intended to support thereon a build plate having the object to be produced, and a controllable optical unit, in turn comprising a laser source, a plurality of lenses, and a mirror arrangement having a plurality of adjustably arranged mirrors, which optical unit is configured to selectively direct a laser beam emitted by the laser source to a point in the build chamber at which the material powder is to be melted. Furthermore, the invention relates to such a system in which a control unit is configured to control the controllable optical unit for carrying out such a method, and to an apparatus formed from such a system and a readout device.

Regarding the prior art in the field of selective powder melting, purely by way of example reference is made to DE 199 05 067 A1, DE 101 12 591 A1, WO 98/24574 A, DE 10 2009 038 165 A1, DE 10 2012 221 641 A1, EP 2 052 845 A2, DE 10 2005 014 483 A1, and WO 2017/084781 A1.

It is known that the method of selective powder melting can be used to produce shaped bodies such as machine parts, tools, prostheses, pieces of jewellery, etc., in accordance with geometric description data for the corresponding shaped bodies by building them up in layers made of metal or ceramic material powder, wherein, in one production process, multiple powder layers are successively applied one on top of the other, and each powder layer is heated with a focused laser beam in a specified region which corresponds to a selected cross-sectional region of the model of the shaped body before the next powder layer is applied so that the material powder in the irradiated regions is melted to form cohesively solidified portions.

Due to different external and internal influences on the controllable optical unit of systems for carrying out such a method with its individual components, such as, for example, mechanical tolerances or displacements between or in components due to thermal expansion, on the melting plane there can be a positional deviation between the target position to be controlled by the mirrors of the mirror arrangement and the true actual position.

For checking and, if necessary, correcting this actual position, in previous methods a measuring grid based on calibration data is inscribed with the laser beam in a medium to be arranged for this purpose, often referred to as a scanning field plate. The measuring grid on the scanning field plate that represents the actual coordinates is then measured using a measuring system provided for this purpose. Based on the measured values determined in this way, a correction is made to the calibration data for controlling the components of the controllable optical unit and is stored in a suitable manner in a control unit of the system. By carrying out this process several times in a row, it is possible to iteratively approximate the actual coordinates to their target values, so that in the event of system interference in the actual coordinates, after a finite number of iterations an arbitrarily small deviation can be achieved between actual coordinates and target coordinates. In the case of dynamic interference, however, it can be assumed that a larger number of iterations will have to be carried out due to a lack of convergence of the iteration series, or that the process will occasionally have to be restarted.

It has now been shown in practice that the calibration process just described has disadvantages in various respects, and it is the object of the present invention to advantageously further develop the method known from the prior art for calibrating such a system.

In particular, it has been shown that there is a significant dynamic interference in the method described above due to the relative position or the positioning inaccuracy between the optical apparatus and the mechanical apparatus of the system. Since the scanning field plate has to be positioned mechanically in the system in order for it to be possible for it to be irradiated by the controllable optical unit for the calibration process, the controllable optical unit has degrees of freedom, such as the relative positioning of its individual components, that is, in particular the adjustably arranged mirrors and the laser source, and further degrees of freedom in terms of the positioning and locking of the scanning field plate relative thereto. These additional degrees of freedom can lead to the aforesaid dynamic interference or can at least generate further tolerances with regard to all spatial and rotational degrees of freedom.

In order to eliminate this problem, according to a first aspect of the invention, the method according to the invention comprises the steps of placing a scanning field plate on the build plate support in the build chamber, creating a plurality of optical reference points on the scanning field plate at predefined positions using the controllable optical unit, creating a measuring grid on the scanning field plate using the controllable optical unit by correspondingly adjusting the mirrors of the mirror arrangement using a calibration data set, and determining the relative positionings between the optical reference points and the measuring grid.

According to the invention, by no longer creating a mechanical, i.e. a geometrically absolute, reference for the measuring grid on the scanning field plate used, but instead by setting optical reference points thereon at predefined positions independently of the mechanical coupling of the scanning field plate in the system, the uncertainties caused by the mechanical degrees of freedom can be completely eliminated, so that the precision and convergence of the method according to the invention is significantly improved compared to the methods known from the prior art. It should be noted in particular that the optical reference points are generated independently of the calibration data used to create the measuring grid and thus form a static reference independent of the actual calibration process.

Since the method according to the invention can also comprise an adjustment of the calibration data set on the basis of the determination of the relative positioning, interference can be corrected directly in order to be able to achieve improved precision in a subsequent production method for an object. Of course, the method according to the invention could also be used only to qualify such a system by determining whether the calibration data set used will allow sufficient precision of the production process on the basis of the determined relative positionings between the optical reference points and the measuring grid.

If the calibration data set is adjusted on the basis of the determination of the relative positioning, the method according to the invention can in particular be carried out iteratively, for example until the relative positionings determined meet one or more predetermined conditions. In the case of the predetermined conditions, maximum deviations in one or more spatial dimensions and/or with regard to rotational degrees of freedom can be considered, or more complex composite parameters can even be used in which, for example, the aforesaid deviations can be included with different weightings.

In order to be able to prevent or reduce a further uncertainty factor in the method according to the invention, at least one of the optical reference points can correspond to an extreme position or another distinct position of at least one of the mirrors of the mirror arrangement and/or at least one of the reference points can correspond to a beam path of the laser beam that is incident perpendicularly to the scanning field plate.

In this way, further mechanical uncertainty factors in the alignment of the aforesaid mirrors for creating the reference points and/or optical aberrations due to refraction of the laser beam at an angle to optical components in the beam path can be reduced or eliminated entirely.

Although the method according to the invention could theoretically be carried out with just one or two optical reference points, three or more optical reference points which in particular should not lie on a straight line should preferably be provided. This excludes all rotational degrees of freedom between the set of reference points and the measuring grid.

Although in principle the measuring grid can take any form as long as this allows sufficient information to be derived about the relationship between the respective target positions and actual positions, it has been shown that it can preferably comprise a plurality of crosses formed by intersecting line portions, wherein the line portions can further preferably intersect at a right angle. On the one hand, these intersection points provide very precisely measurable geometric data points and, on the other hand, they can be recorded and read relatively easily in automated processes using pattern recognition.

In this context, the method according to the invention can also comprise determining the relative positionings and, if necessary, adjusting the calibration data set in an automated manner using a readout device which is configured to determine the relative positionings using pattern recognition. In this way, the method according to the invention can be carried out in an automated manner, which can further improve the efficiency and precision thereof.

Another disadvantage of known methods for calibrating systems for selective powder melting occurs in connection with the fact that the scanning field plates used must be clearly identified in order to be able to understand the adjustments made to data sets and the individual iteration steps. In particular, information such as a serial number of the system, a current iteration number, a last-used correction file, etc., must be securely transferred with the scanning field plate from the system to a measuring device used and back. Since, in previously known methods, this information has to be maintained manually by operators of the specific systems and devices, i.e. the scanning field plates are identified by applying labels and the like, this is another potential source of error, since experience has shown that activities carried out manually in this way can result in mix-ups or confusion which, in the worst case, can render useless the entire iterative process carried out thus far.

To solve this problem, according to a second aspect, which can be provided as an alternative or in addition to the first aspect of the present invention in a method according to the invention, it is proposed according to the invention that, after placing a scanning field plate on the build plate support in the build chamber before, during, or after creating a measuring grid on the scanning field plate, a unique identification element also be created on the scanning field plate using the controllable optical unit by correspondingly adjusting the mirrors of the mirror arrangement using a calibration data set, wherein where appropriate, according to the first aspect of the invention, a plurality of optical reference points can be created on the scanning field plate at predefined positions using the controllable optical unit and the relative positionings between the optical reference points and the measuring grid can be determined.

By creating the unique identification element directly on the scanning field plate while performing the calibration method according to the invention according to the first aspect or even in connection with a calibration method known from the prior art in which, for example, the creation of optical reference points is dispensed with in favour of known mechanical positioning data, the user of the system is relieved of the responsibility for ensuring that the scanning field plates used are clearly identified. In this way, operator errors in this context are reliably prevented.

In particular, the unique identification element can comprise a QR code, a bar code, and/or an alphanumeric code which encodes a serial number of the system, a current iteration number, a calibration data set used and/or a key value for database access. Of course, any other conceivable identification elements can also be provided and, for example, metadata can also be encoded, such as a time stamp, an identifier for the operator of the system during the calibration process, and the like.

Since the method also comprises storing the data relating to the calibration method carried out and relating to the identification element in a database, the information to be encoded in the identification element itself can be reduced, since in this way only a unique identifier for the corresponding calibration process has to be encoded and all related data can be stored in the database, wherein it is possible to access these data using the unique identifier as a key value.

According to a further aspect, the present invention relates to a system for producing objects made of a material powder according to the method of selective powder melting, the system comprising a build chamber which is intended to accommodate the powder to be melted and the object to be produced, a build plate support which is provided in the build chamber in a height-adjustable manner and is intended to support thereon a build plate having the object to be produced, a controllable optical unit, in turn comprising a laser source, a plurality of lenses, and a mirror arrangement having a plurality of mirrors arranged in an adjustable manner, which optical unit is configured to selectively direct a laser beam emitted by the laser source to a point in the build chamber at which the material powder is to be melted, and a control unit which is configured to control the controllable optical unit for carrying out a method according to the first and/or second aspect of the present invention.

In particular, the controllable optical unit can comprise a hermetically sealed housing in which at least some of the plurality of adjustably arranged mirrors and at least some of the plurality of lenses are arranged, and which comprises a transparent pane which allows the laser beam to enter the build chamber from the housing. Such a closed housing is often referred to as an "optics box" and is provided as a single modular component for systems of the type in question.

Furthermore, the present invention relates to an apparatus formed from the system just described and a readout device which is configured to determine the relative positionings between the optical reference points and the measuring grid and/or to read out the unique identification element on the scanning field plate which has/have been applied there according to the first and/or second aspect of the present invention.

In particular, the readout device can also be configured to automatically adjust the calibration data set on the basis of the determination of the relative positionings and/or to store data relating to the unique identification element in a database and/or to read said data out therefrom and/or to display them to a user. Any known display devices which can both be integrated in the system and can receive the data to be displayed via any data connections can be provided for displaying this information.

Further features and advantages of the present invention will become even clearer from the following description of an embodiment, when said embodiment is considered together with the accompanying drawings. In detail, in the drawings.

Figure 1:
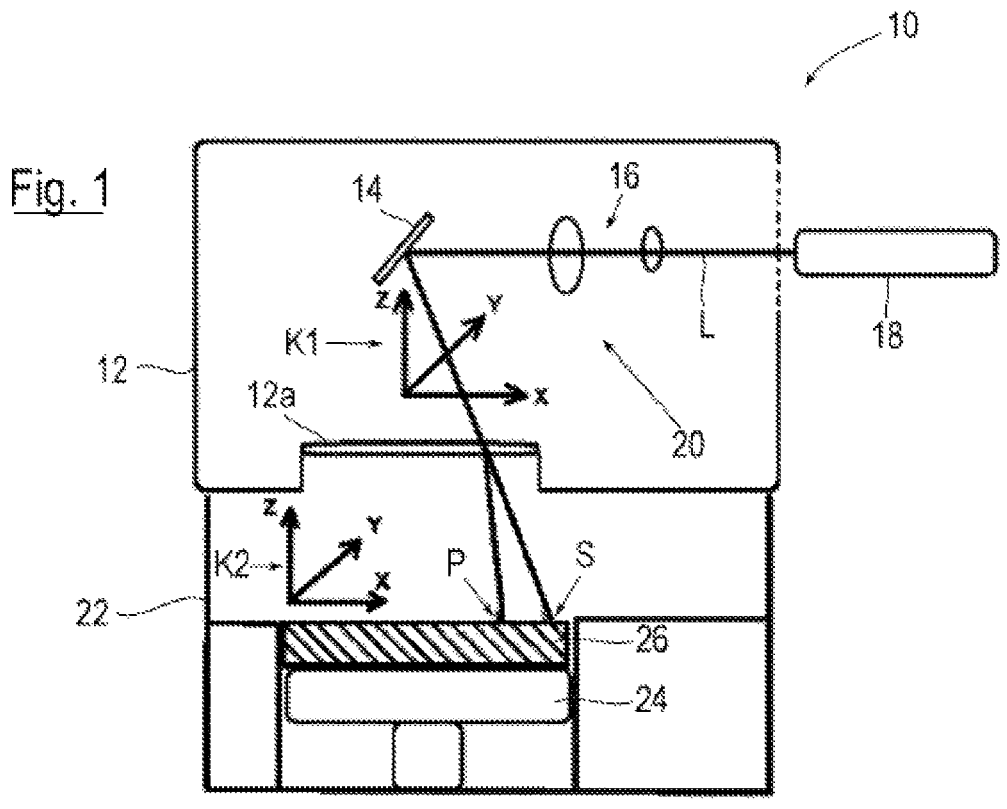
FIG. 1 is a schematic view of an inventive system.

In FIG. 1, first a system for producing objects made of a material powder according to the method of selective powder melting is shown in a purely schematic cross-sectional view and is denoted by reference numeral 10.

The system 10 comprises optical and mechanical components which form an optical apparatus and a mechanical apparatus in the usual nomenclature in this field. In this case, the essential optical components are received in a so-called optics box 12 which accommodates, among other things, a plurality of adjustably arranged mirrors 14 and a lens system 16. Here, only one mirror 14 is shown for reasons of clarity, and the lens system 16 is also only indicated schematically. Overall, the mirrors 14 together with the lens system 16 and an externally arranged laser source 18, from which a laser beam is radiated into the optics box 12, form a controllable optical unit 20. Because the components of the optical unit 20 are suitably controlled by a control unit (not shown), the laser beam L, after passing through the lens system 16 and being reflected on the mirrors 14, can be directed at an angle out of the optics box 12 through a transparent pane 12a into a build chamber 22 such that the laser beam is to impinge on an irradiation plane at a target position S, on which plane a material powder is to be selectively melted during regular operation of the system 10.

For the present calibration process, however, there is no build plate and also no material powder in the build chamber 22 on the height-adjustable build plate support 24, but instead there is a scanning field plate 26. This scanning field plate 26 is made of a material in which markings can be written by irradiating the laser beam L. To this end, for example, anodised aluminium plates are used, but other suitable materials which can be written on with a laser beam typically used for melting material powder in such systems can also be considered.

In the illustration from FIG. 1, however, due to various possible interference effects, the laser beam L does not impinge on the scanning field plate 26 at the target position S, but instead at an actual position P. The deviation between the target position S and the actual position P when the laser beam L arrives at the scanning field plate 26 can be reduced by correspondingly calibrating the control of the controllable optical unit 20, wherein initially interferences in the coordinate system K1 of the controllable optical unit 20 can cause the deviation between the target position S and the actual position P. If, as has been customary in the prior art, an absolute position of the marking produced at the actual position P by irradiating the laser beam L onto the scanning field plate 26 is now taken as a measure for the deviation between the two positions, then additional interferences in the coordinate system K2 of the mechanical apparatus would have to be taken into account, since the positioning and also the rotational position of the scanning field plate 26 on the build plate support 24 and other degrees of freedom, such as the relative positioning of the optics box 12 to the build chamber 22, represent further sources of interference or errors. Since these mechanical sources of interference can deviate from measurement to measurement, this is a dynamic system error, which can lead to the iterative methods provided not converging quickly in a meaningful way or at all.

Figure 2:
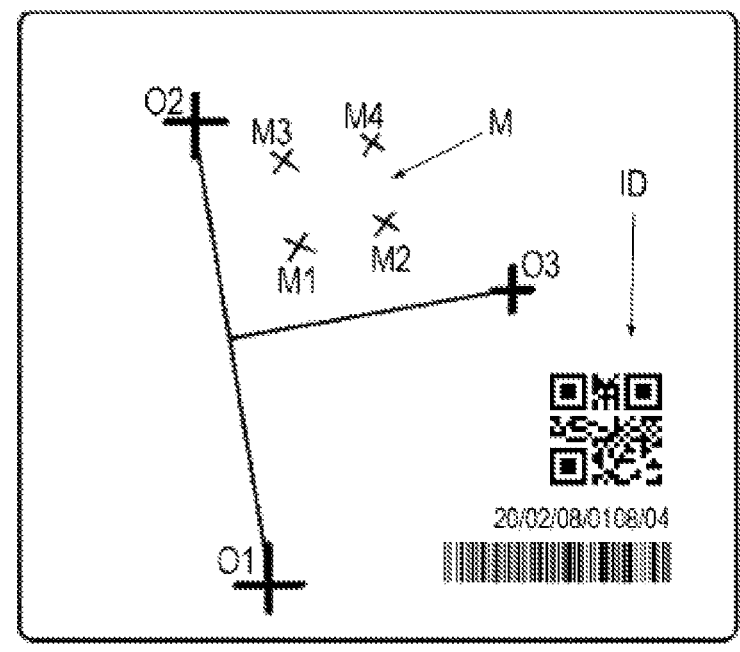
FIG. 2 is a schematic view of a scanning field plate used in a method according to the invention in the system from FIG. 1.

In contrast to this method known from the prior art, according to the present invention the irradiation of the scanning field plate 26 is carried out such that the pattern shown in FIG. 2 is generated on the scanning field plate 26. First, an optical coordinate system is generated on the scanning field plate 26 from three optical reference points O1 to O3, wherein the three points O1 to O3 are always generated at well-defined points that are not subject to calibration and that are preferably marked such that at least one of the mirrors 14 of the optical unit 20 is in an end position or in some other distinct position and/or the beam path of the laser beam L through the pane 12a, and thus the impingement on the scanning field plate 26, are perpendicular in order to exclude imaging errors.

Relative to the optical coordinate system formed from the points O1 to O3, a plurality of cross-shaped markings M1 to M4 are now inscribed on the scanning field plate 26 with the laser beam L using the calibration data set. By using the calibration data set from the control unit of the system 10 to generate these markings M1 to M4 forming a measuring grid M, which calibration data set would also be used in particular during regular operation of the system 10, the deviation between the expected target positions of the markings M1 to M4 and their true actual positions can now be determined independently of the mechanical apparatus in a subsequent step of determining these relative positionings.

On the basis of this determination, a corrected calibration data set can then be created, so that the actual positions can iteratively approach the target positions in several steps, wherein the reading out of the markings M1 to M4 on the scanning field plate 26 and also the subsequent creation of a new calibration data set can be carried out in a dedicated external readout device.

It should also be noted that identification elements ID have also been inscribed on the scanning field plate 26 using the laser beam L, wherein in the embodiment shown in FIG. 2 both a bar code and a QR code, as well as an alphanumeric code, are shown by way of example, while in practice usually only one of the codes will be used.

This identification element can be used, for example, to encode the current iteration, a serial number of the system 10, and other relevant data, which can then also be read out in an automated manner and operator errors when marking and handling the scanning field plates 26 from subsequent iterations or different systems can be prevented.

The invention claimed is:

1. A system for producing objects made of a material powder by selective powder melting, comprising:

a build chamber to accommodate the material powder to be melted and an object to be produced;

a height-adjustable build plate support provided in the build chamber to support a build plate on which the object to be produced will be built;

a controllable optical unit comprising a laser source, a plurality of lenses, and a mirror arrangement having a plurality of adjustably arranged mirrors, wherein the controllable optical unit is configured to selectively direct a laser beam emitted by the laser source to a point in the build chamber at which the material powder is to be melted; and a control unit to control the controllable optical unit to:

i) create a plurality of optical reference points on a scanning field plate that is arranged on the height-adjustable build plate, wherein the plurality of optical reference points is applied by the laser beam to the scanning field plate at predefined positions, and ii) generate a measuring grid on the scanning field plate that is arranged on the height-adjustable build plate, wherein the measuring grid is applied by the laser beam to the scanning field plate by adjusting the mirrors of the mirror arrangement using a calibration data set; and a readout device to determine relative positionings between the optical reference points and the measuring grid on the scanning field plate that is arranged on the height-adjustable build plate.

2. The system of claim 1, wherein the controllable optical unit comprises a hermetically sealed housing in which at least some of the plurality of adjustably arranged mirrors and at least some of the plurality of lenses are arranged, wherein the controllable optical unit comprises a transparent pane which allows the laser beam to enter the build chamber from the housing.

3. The system of claim 1, wherein the readout device is configured to read out a unique ID on the scanning field plate.

4. The system of claim 1, wherein the readout device is further configured to automatically adjust the calibration data set based on the determination of the relative positionings.

5. The system of claim 1, wherein the readout device is further configured to read the calibration data out from a database.

6. The system of claim 3, wherein the readout device is further configured to store data relating to the unique ID in a database.

\* \* \* \* \*